Figure 1:
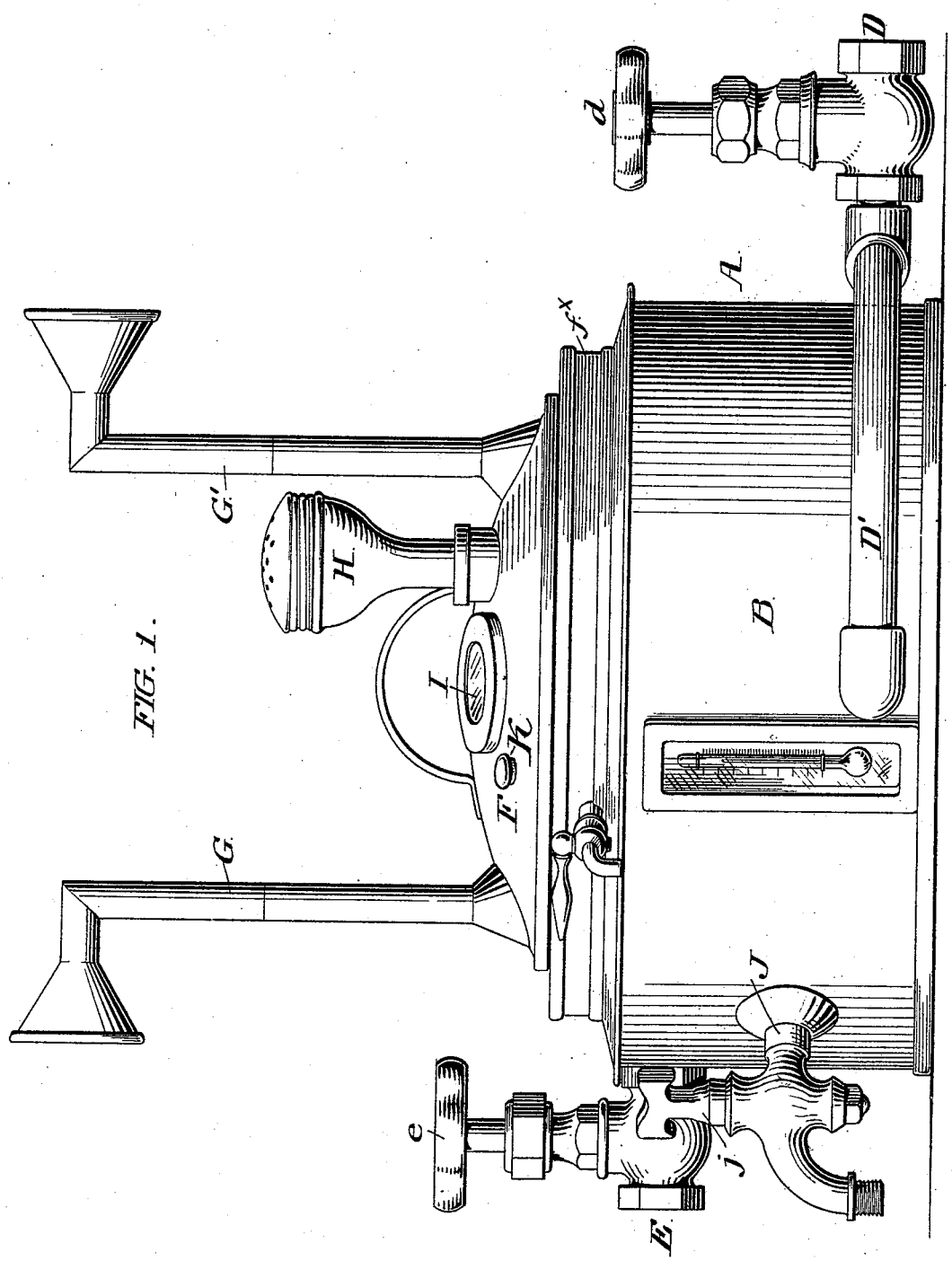

(No Model.) 3 Sheets—Sheet 1.
A. MYERS.
PROCESS OF MANUFACTURING YEAST.
No. 528,643. Patented Nov. 6, 1894.

WITNESSES:
O. F. Dagle
R. M. Russell

INVENTOR:
Angelo Myers
By his attorneys
Strawbridge & Taylor (No Model.) 3 Sheets—Sheet 3.

A. MYERS.
PROCESS OF MANUFACTURING YEAST.

No. 528,643. Patented Nov. 6, 1894.

WITNESSES:
P. H. Eagle.
R. M. Russell

INVENTOR:
Angelo Myers
By his attorneys
Strawbridge & Taylor

UNITED STATES PATENT OFFICE.

ANGELO MYERS, OF PHILADELPHIA, PENNSYLVANIA.

PROCESS OF MANUFACTURING YEAST.

SPECIFICATION forming part of Letters Patent No. 528,643, dated November 6, 1894.

Application filed May 20, 1892. Serial No. 433,727. (No specimens.)

*To all whom it may concern:*

Be it known that I, ANGELO MYERS, a citizen of the United States, residing in the city and county of Philadelphia, in the State of Pennsylvania, have invented certain new and useful Improvements in Processes of Manufacturing Yeast, of which the following is a specification.

In the manufacture of yeast in quantity according to the methods usually employed, several fermentations, physically or chemically distinguishable from each other, contemporaneously take place, and ferments of physically or chemically dissimilar character are produced at the same time, with the result that the yeast produced is of heterogeneous germinal composition.

While the yeast referred to, though heterogeneous, is used for many purposes in the arts for which yeast is commonly employed, yet the fact has been recognized that the characteristic differences between the several varieties or types of ferments in the product referred to, are such that each of the varieties or types may be used in given employments to greater advantage than the others.

In the manufacture of distilled liquors, for example, and especially of whisky, it has been discovered that ferments which produce vinous or alcoholic fermentation, can be employed with better results than attend the use of those that produce lactic, acetic, or other non-alcoholic fermentation, but heretofore it has been difficult, if not impossible, to produce, upon a commercial scale, a yeast of the character desired.

My invention relates to the manufacture of yeast composed of a selected variety of ferments and its object is to provide a simple, inexpensive and reliable process of producing a yeast composed exclusively of the germs that produce vinous or alcoholic fermentation.

My improved process is founded upon the fact, that non-alcoholic ferments, deprived of ordinary air, and supplied only with air filtered free from the germs which exist in ordinary air, perish, while alcoholic ferments supplied only with such filtered air, develop and multiply.

Generalized my improved process consists first, in developing a mass or quantity of yeast containing several ordinary varieties of ferments; second, in destroying all ferments except those of the alcoholic variety.

In the practice of my process the yeast with which the opeartion is started may be ordinary heterogeneous yeast. I prefer, however, to employ a yeast made as follows: Hop water, made by boiling fresh hops in water, and then straining the mixture, is, at a temperature of about 176° Fahrenheit admixed with a mass of finely ground barley malt meal, and, after standing an hour and a half, or thereabout, is strained, and additional hop water is added in such quantity that the mixture is brought to an indication of 15° on the saccharometer. This wort is then first brought to a temperature of about 212° Fahrenheit and is next cooled to a temperature of about 92° Fahrenheit and is maintained at or about the latter temperature until its saccharine constituent is, by the fermentation of the mass, due to the fact that the mass receives germs from the atmosphere with which it is in contact, destroyed to an indication of from 5° to 7° on the saccharometer. The mass, which has been in contact with or exposed to the ordinary unfiltered air, contains a quantity of heterogeneous yeast.

In the practice of my process, in the apparatus hereinafter described, I first thoroughly cleanse or sterilize the fermenting chamber employed, by introducing therein steam at a suitable temperature. This chamber, it may be remarked at this point, is provided with openings leading to the atmosphere and adapted to permit the entrance of air, but to exclude germs, this end being attained by the expedient of filling said openings with plugs of cotton wool. The sterilization being accomplished, I introduce to said chamber a mass of wort, preferably made in the manner described, of hop water and barley, at a temperature of about 212° Fahrenheit, and thereupon, by admitting cold water to the water chamber, or otherwise, I reduce the temperature of the mass to a point between 75° and 95° Fahrenheit, but preferably to 92° Fahrenheit and then introduce thereto the heterogeneous yeast described, in about the proportion of one quart of said yeast to eight gallons of the wort. This mixture is retained at about the temperature last mentioned to ferment, until the saccharine indication of the mass on the saccharometer is between 5° and 7°. The air in said fermenting chamber having first been sterilized as described, and the air subsequently entering the chamber, during the fermentation, through the air openings provided with stoppers of cotton or wool, being deprived of ferments the non-alcoholic germs contained in the fermenting mass receive no nourishment from the air or air germs and become gradually dormant and extinct, while the alcoholic ferments, inasmuch as the exclusion of atmospheric germ life does not affect them, develop and multiply,—and this extinction of the non-alcoholic, and development of the alcoholic ferments is further aided by reason of the maintenance of the mass at a temperature of about 92° Fahrenheit that temperature being, as I have found, the one at which the alcoholic ferments grow with the greatest rapidity, and one moreover, unfavorable to the development of non-alcoholic ferments. In this step of the process, therefore, the decrease of saccharine matter from fifteen down to five or seven is represented by the development of alcoholic ferments, while the quantity of non-alcoholic ferments, owing to the maintenance of conditions unfavorable to them, is considerably lessened. The mass, the saccharine element of which has been reduced to the low indication mentioned, and further considerable reduction of which would leave insufficient nourishment for the development of the alcoholic ferments and therefore injuriously affect them,—is now drawn off from the chamber, and in so drawing it, I first draw off and keep separate from the remainder, the upper and central portion of the mass, which represents the principal portion of the vigorous alcoholic ferments, and is employed in the next step of the process,—while the lower portion of the mass, largely consisting of non-alcoholic ferments in either a dormant or a dead condition, which have sunk to the bottom, and constitute the remainder referred to, are discarded. The fermenting chamber is again sterilized and again charged with wort, preferably made in the manner described, and at a temperature first of 212° which is subsequently reduced to 92°, to which wort, at said last named temperature, yeast, produced in the preceding step of the operation, is introduced in the proportion of about one quart of said yeast to eight gallons of the wort, and the mass is then permitted to ferment, under the conditions set forth, with the result of the further reduction of the number of non-alcoholic, if any remain at the time, and further multiplication of alcoholic, ferments, take place. This step is repeated until all of the non-alcoholic ferments are eliminated from the yeast, leaving a yeast formed entirely of alcoholic ferments produced under conditions most favorable to their normal and most vigorous condition.

The reason the non-alcoholic germs sink to the bottom of the vessel under the conditions stated, is that said non-alcoholic germs are of specific gravity in excess of that of the liquid and that constant motion on the part of said germs is necessary to enable them to maintain themselves at the level of the central or upper portions of the mass of liquid; that therefore when said mass is maintained at a temperature unfavorable to said germs and in the presence of an atmosphere from which atmospheric germs are excluded, said non-alcoholic germs, becoming dormant, are incapable of the activity required to support them in the body of the liquid, and therefore sink to the bottom as described.

Figure 2:
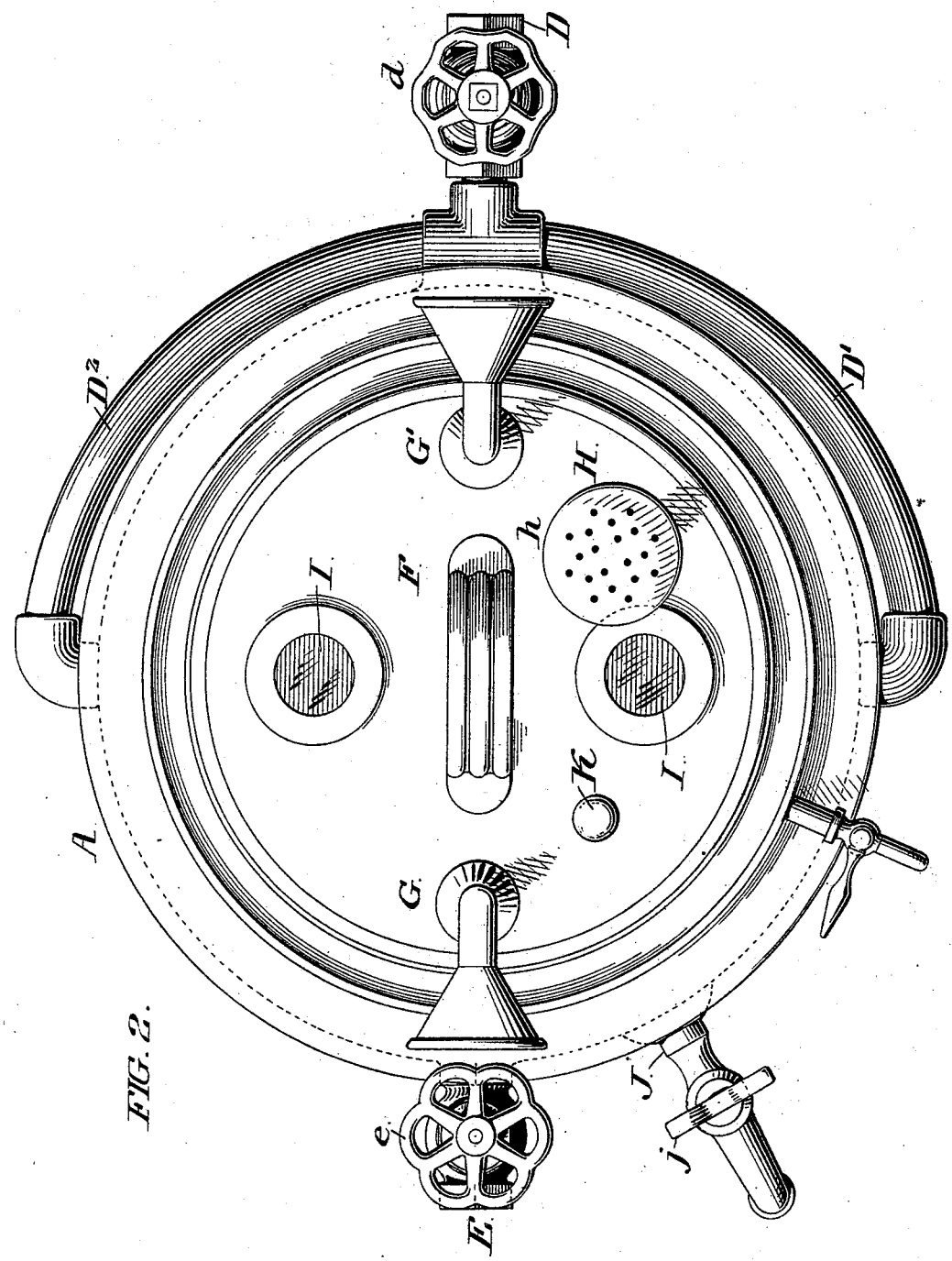
Figure 3:
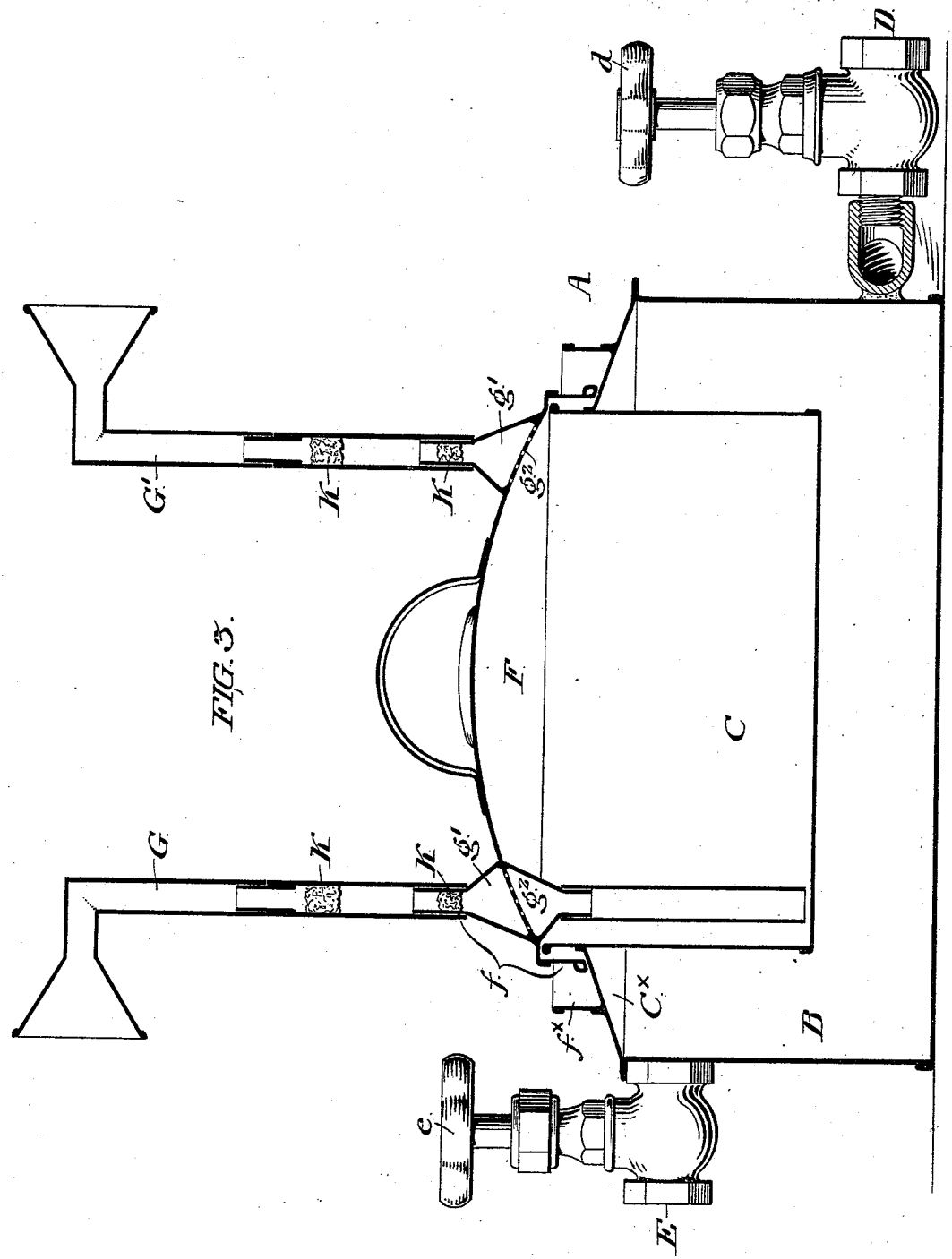

An apparatus by the employment of which I am enabled to effectively carry on the foregoing operation is illustrated in the accompanying drawings and may be described as follows:

In the drawings Figure 1 is a view in side elevation, Fig. 2 a top plan view, and Fig. 3 a vertical central sectional elevation, of the apparatus which I prefer to employ.

A is a structure of any preferred dimensions, material and configuration, embodying a fermenting chamber and a liquid chamber, arranged in such relationship to each other that, while the contents of the respective chambers are maintained apart from each other, the area of their mutual contact with the common separating wall between them is as extensive as possible, to the end that the temperature of the contents of the one may exert the maximum influence upon the temperature of the contents of the other.

The structure A consists of a tank B of suitable dimensions and shown as of circular plan, and of a tank C likewise of circular plan but of less diameter than the tank B, preferably made of sheet metal, and supported in said tank B at such elevation that a space is left between the opposing sides and bottoms of the respective tanks, and this space I employ as a water or steam chamber, while the interior of the tank C constitutes the fermenting chamber. The water and steam chamber is closed by an annular diaphragm $C^x$ bridging the space between the upper edges of the respective tanks, and by preference the diaphragm is permanently affixed to said tanks, said diaphragm, in the construction shown, constituting the support for the tank C.

D is a supply pipe, controlled by a cock or valve $d$, adapted to supply water or steam to the water and steam chamber, and conveniently divided into two branches $D'\ D^2$ which enter said chamber at opposite sides of the structure for the better distribution of the water or steam, and preferably near the basal portion of the chamber.

E is a pipe controlled by a valve $e$ leading from the upper portion of the water chamber, and serving as a water or steam outlet. This arrangement of the outlet only permits the escape of water when the compartment is full to its level.

F is a lid fitted upon the fermenting chamber, the flange $f$ of which lid depends between the upwardly extending circumferential rim of the fermenting chamber and an upwardly extending circumferential projection $f^{\times}$ rising from said diaphragm, the space between the said rim and projection being filled with water to form with said flange a liquid seal.

G G' are pipes leading to the interior of the fermenting chamber, and terminating respectively near the top and bottom thereof. To avoid traversing the water and steam chamber these pipes are mounted in connection with the lid. Each of these pipes is provided at its upper end with an enlarged mouth, to promote the access of air to the interior of said pipes. Each pipe is as a matter of convenience formed of a number of independent sections, so that said pipes may be built up to a required height. Each pipe has a suitable enlargement, $g'$, at the point where it engages with the lid, and is interiorly provided with a perforated diaphragm, $g^2$, being a part of the metal of the lid. The pipe G extends to and terminates at a point near the bottom of the fermenting chamber, and the pipe G' terminates near the top of said chamber, so that air is delivered at the top and bottom of the contained mass, respectively.

H is a pipe similarly leading to the interior of the fermenting chamber. This pipe passes through an opening in the lid of the fermenting chamber. Two permanent circumferential flanges, adapted to contain water between them, surround the opening through which the pipe H passes, and a depending flange attached to the pipe H is adapted, when said pipe is seated in said lid, to fit between said flanges, to form with them a liquid seal.

Within each of the pipes G G' and H are fitted plugs of filtering material such as cotton wool.

I are sight openings in the lid, hermetically closed by a suitable transparent medium such as glass.

J is a pipe leading from the interior of the fermenting chamber through the water and steam chamber to the exterior of the structure where it is provided with a cock $j$.

The pipe H is employed as an outlet for the escape of gases, and is as to its upper end, normally closed with a cap $h$, suitably apertured.

K is a sealed or closed opening through which material may be charged into the fermenting chamber.

The steps of the improved process for manufacturing alcoholic yeast hereinbefore described, are carried out in this apparatus in the following manner, that is to say: first, when it is desired to sterilize the fermenting chamber of the apparatus the lid F is fitted thereto, the pipes G G' H are placed in position and the water seals described are filled with water. Suitable connection being made between the pipe J and a source of steam supply the cock $j$ is opened and steam at the requisite high temperature is admitted through said pipe J to the interior of the fermenting chamber, where it destroys all germ life existing within the same or within the pipes G G' H below the cotton wool therein, excess of steam and air under the steam pressure, escaping through said plugs of cotton wool.

To bring the material placed within the fermenting chamber to the various temperatures described as incident to the carrying out of my improved process, I employ the water and steam chamber described. To impart to the contents of the fermenting chamber any given temperature, the cock $d$ of the pipe D, which is assumed to be for the time being in communication with an appropriate source of supply,—is opened, and water, or steam, of the proper temperature, is charged into the water and steam chamber, where it makes contact with the bottom and sides of the sheet metal fermenting chamber. The cock of the pipe E is then opened and the water or steam thereupon flows through both the pipes D and E and continuously circulates about and against the fermenting chamber.

Having thus described my invention, I claim—

1. The process of making pure yeast of a selected variety, herein set forth, which consists in combining heterogeneous yeast with a mass of nutritive material containing elements especially favorable to the development of ferments of the character required,—in fermenting the mass, at a selected temperature, in the presence of the atmosphere but from which atmospheric germs are excluded,—in combining the yeast resulting from such fermentation with fresh nutritive material, and fermenting the mass, at said selected temperature, in the presence of the atmosphere but from which atmospheric germs are excluded,—and in repeating the last mentioned step, each time with fresh nutritive material and yeast resulting from the preceding operation, until the ferments of the character not desired are eliminated and the required quality of yeast is produced, substantially as set forth.

2. The process of producing a mass of pure alcoholic yeast from a mass of wort and heterogeneous yeast, which consists in fermenting a mass of wort or sacchariferous material and heterogeneous yeast, at a temperature of about 92° Fahrenheit in the presence of the atmosphere but from which atmospheric germs are excluded,—in combining yeast resulting from said fermentation with fresh sacchariferous material, and maintaining the mass, for fermentation, at a temperature of about 92° Fahrenheit in the presence of the atmosphere but from which atmospheric germs are excluded,—and in repeating the last mentioned step, each time with fresh sacchariferous material and yeast resulting from the preceding operation, until the required quality of alcoholic yeast is produced, substantially as set forth.

3. The process of producing a mass of pure alcoholic yeast, which consists in fermenting a mass of racchariferous material and yeast, at a temperature of 92° Fahrenheit in the presence of the atmosphere but from which atmospheric germs are excluded,—in drawing off the vigorous ferments exclusive of the dormant ferments in the lower portion of the mass,—in combining the said vigorous ferments with fresh sacchariferous material, and maintaining the mass at a temperature of 92° Fahrenheit in the presence of the atmosphere but from which atmospheric germs are excluded,—and in repeating the operation of drawing off the mass of vigorous ferments, combining them with fresh sacchariferous material and fermenting the mass under the conditions recited, until the required quality of alcoholic yeast is produced, as specified.

In testimony that I claim the foregoing as my invention I have hereunto signed my name this 13th day of April, A. D. 1892.

ANGELO MYERS.

Witnesses:
WM. C. STRAWBRIDGE,
J. BONSALL TAYLOR.

It is hereby certified that Letters Patent No. 528,643, granted November 6, 1894, upon the application of Angelo Myers, of Philadelphia, Pennsylvania, for an improvement in "Processes of Manufacturing Yeast," errors appear in the printed specification requiring correction as follows: In line 9, page 2, the word "ferments" should read *germs;* and in line 10, same page, the word "germs" should read *ferments;* and that the said Letters Patent should be read with these corrections therein that the same may conform to the record of the case in the Patent Office.

Signed, countersigned, and sealed this 11th day of December, A. D. 1894.

[SEAL.]

JNO. M. REYNOLDS,
*Assistant Secretary of the Interior.*

Countersigned:
JOHN S. SEYMOUR,
*Commissioner of Patents.*